United States Patent [19]

Swain

[11] 4,125,031

[45] Nov. 14, 1978

[54] COUPLER FOR TWO ECCENTRICALLY ROTATING MEMBERS

[76] Inventor: James C. Swain, 3891 Mountview Rd., Columbus, Ohio 43220

[21] Appl. No.: 756,064

[22] Filed: Jan. 3, 1977

[51] Int. Cl.² .................. F16H 21/12; F04C 1/00
[52] U.S. Cl. .................................. 74/63; 418/173
[58] Field of Search ............ 418/61 R, 164, 172, 418/173, 174, 176, 165, 166, 154; 74/63, 69

[56] References Cited

U.S. PATENT DOCUMENTS

| | | | |
|---|---|---|---|
| 1,941,651 | 1/1934 | Behlmer | 418/173 X |
| 2,064,635 | 12/1936 | Stern | 418/173 |
| 2,714,372 | 8/1955 | Williams | 418/173 |

FOREIGN PATENT DOCUMENTS 14,547 of 1885 United Kingdom ............... 418/61 R

Primary Examiner—Carlton R. Croyle
Assistant Examiner—Leonard E. Smith
Attorney, Agent, or Firm—Richard W. Hanes

[57] ABSTRACT

A coupler for joining two eccentrically rotating members for simultaneous rotation about their respective axes at the same angular velocity without angular phase shift. The invention is particularly useful for coupling the rotor and cam ring in certain types of positive fluid displacing devices. The coupling includes a double crank member with a central portion extending along a first axis and two end portions extending from each end of the central portion along a second axis parallel to the first. The central portion is received in a bore in the inner member and the end portions are received in opposing mutually parallel slots in the outer member.

9 Claims, 7 Drawing Figures

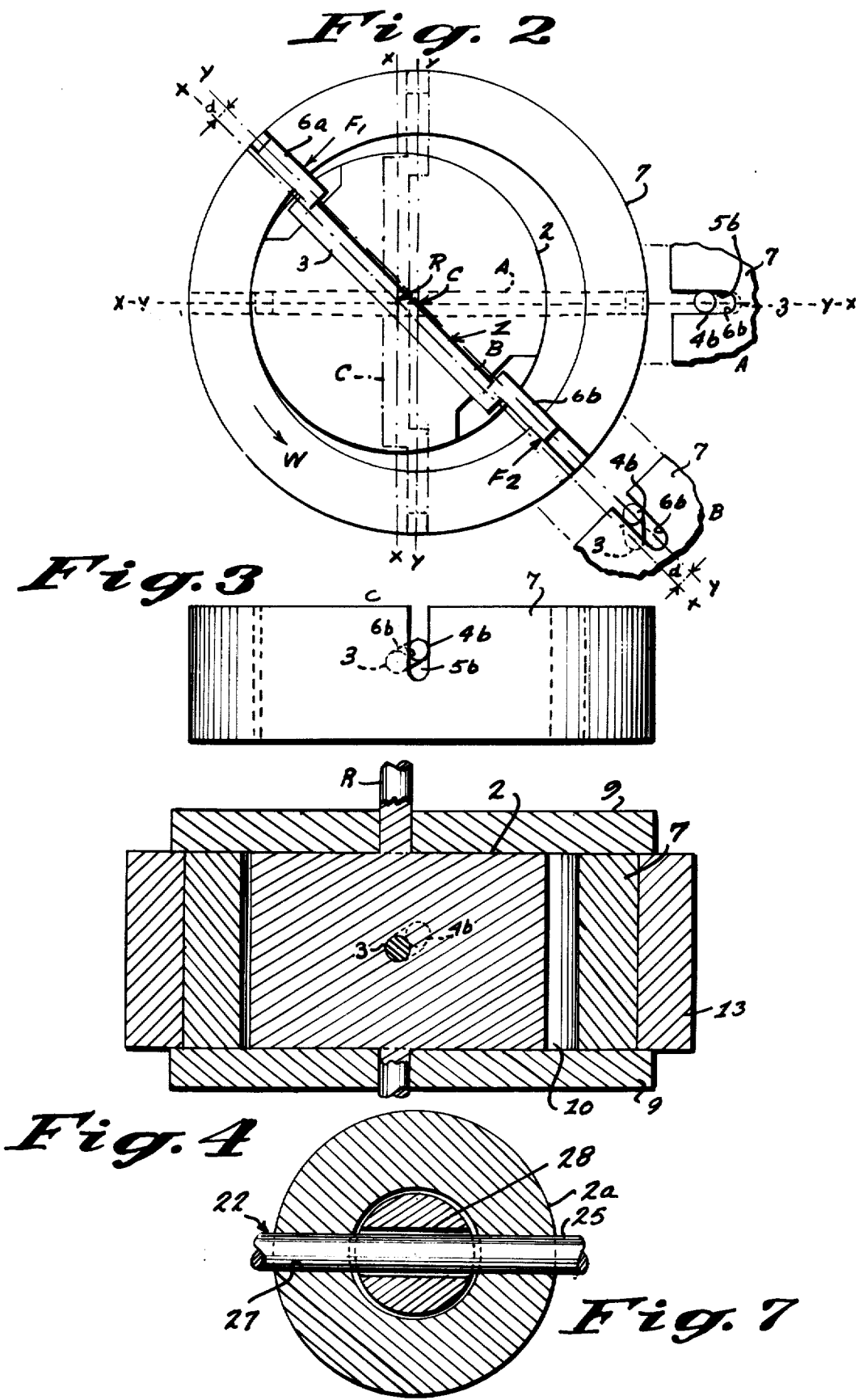

COUPLER FOR TWO ECCENTRICALLY ROTATING MEMBERS

BACKGROUND OF THE INVENTION AND PRIOR ART

Known types of positive fluid displacing devices which can be used as either a pump or a motor for liquids or gases comprise an eccentrically mounted rotating cam ring and rotor interconnected by vanes defining a plurality of pumping chambers. For purposes of identification, this type of device will be referred to herein as a constrained vane device. The rotor is driven within the rotating cam ring about an axis eccentric to the axis of the cam ring so that the volume of space enclosed by the rotor periphery, cam ring, closure plates, and any two adjacent vanes varies from a maximum to a minimum during each revolution. Such devices traditionally have fixed or variable displacements, depending on the application. Displacement variation is obtained by changing the amount of offset between the axes of rotation of the rotor and cam ring. To accommodate the ever changing relationship between rotor and cam ring, the vanes are pivotally connected at one end to one of the rotating members and slidably received at the other end by the other member. Often, the slidable connection in one of the members is also pivotable. Examples of this general type of fluid displacing devices are disclosed in U.S. Pat. Nos. 1,210,042, 1,941,651, 2,714,372 and 3,426,693.

A primary design problem in these fluid displacing devices is coupling the cam ring and rotor together so that they maintain the same angular velocity over a total revolution and there is zero phase shift between them. Any cyclic difference in the angular velocity of the two rotating members will produce undesirable loads and wear on the coupler and other parts of the device, excessive vibration and fluid pressure pulsations in the system. Angular phase shift between the rotating members can also alter the intended timing of the moving parts so that the maximum capability of the device is not achieved.

One technique for rotating the cam ring and rotor together is to provide one member with pins which move in enlarged holes in the other. A second technique is to mesh the gears of the drive means for each rotating member. The first technique is used in U.S. Pat. Nos. 1,210,042, 1,941,651, 2,714,372 and 3,426,693. The aforesaid U.S. Pat. No. 1,941,651 to Behlmer also illustrates the second technique in FIGS. 6 and 7. Neither technique provides an acceptable solution to the coupling problem of a variable displacement device and they provide only a marginally acceptable solution for a fixed displacement device.

OBJECTS OF THE INVENTION

The primary object of the present invention is to provide a coupler for operatively joining two eccentrically disposed members for rotation at the same angular velocity about their respective axes. The coupler is adaptable for use in synchronizing the rotation of a cam ring and rotor in a positive fluid displacing device.

Another object is to provide a coupling between eccentrically rotating members that produces low bearing loads by using a long lever arm attached near its extremities to the members.

Another object of the invention is to provide a coupling for a driving interconnection between a rotating inner member and an eccentrically mounted outer ring as are found on fluid displacing devices such as pumps, motors or heat engines, and where the coupling will not violate the fluid sealing characteristics of the device.

A further object is to provide a constant velocity coupling that is easy to assemble, economical to produce, and not unduly affected by manufacturing tolerances.

Other and still further objects, features and advantages of the invention will be apparent from a reading of the following detailed description of a preferred embodiment taken in connection with the accompanying drawings in which:

FIG. 1 is a cross sectional view through a positive fluid displacement pump having an interior driven rotor and a cam ring, and wherein the rotor and cam ring are eccentrically rotated with respect to one another, and wherein the rotor and cam ring are coupled together by the coupling crank arm of the present invention. In the embodiment shown, the axis "X" of the coupling crank arm does not pass through the axis of rotation "R" of the rotor.

FIG. 2 is a diagramatic cross sectional view of the rotor and cam ring of a device similar to that shown in FIG. 1, illustrating, with a series of two fragmentary side views, the angular positions of the coupling crank during the 0° and 45° rotational positions of the rotor and cam ring. For clarity, the vanes are not shown. The embodiment depicted in this Figure illustrates the special case where the axis "X" of the coupling crank arm passes through the axis of rotation "R" of the rotor.

FIG. 3 is a side view of the cam ring showing with full and dotted lines the position of the crank arm and crank pin at the 90° position of rotation as that position would be related to the positions of FIG. 2.

FIG. 4 is a cross sectional view of the pump of the present invention taken along lines 4—4 of FIG. 1.

Figures 5, 6:
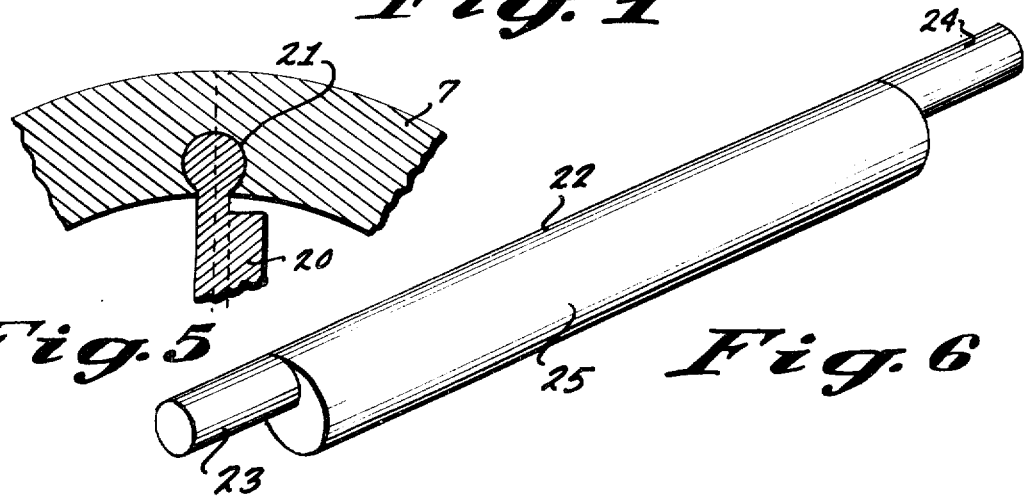
FIG. 5 is a cross sectional view of a modified form of the coupling crank wherein the ends of the crank are spherical and the receiving slots in the outer rotating members are substantially cylindrical.

FIG. 6. is a perspective view of a modified form of crank coupler to be constructed as a single unitary member.

FIG. 7 is a view of the central portion of the coupling crank as installed in a rotor driven by a non-integral shaft. The rotor and shaft are shown in cross section.

DETAILED DESCRIPTION OF THE INVENTION

Figure 1:
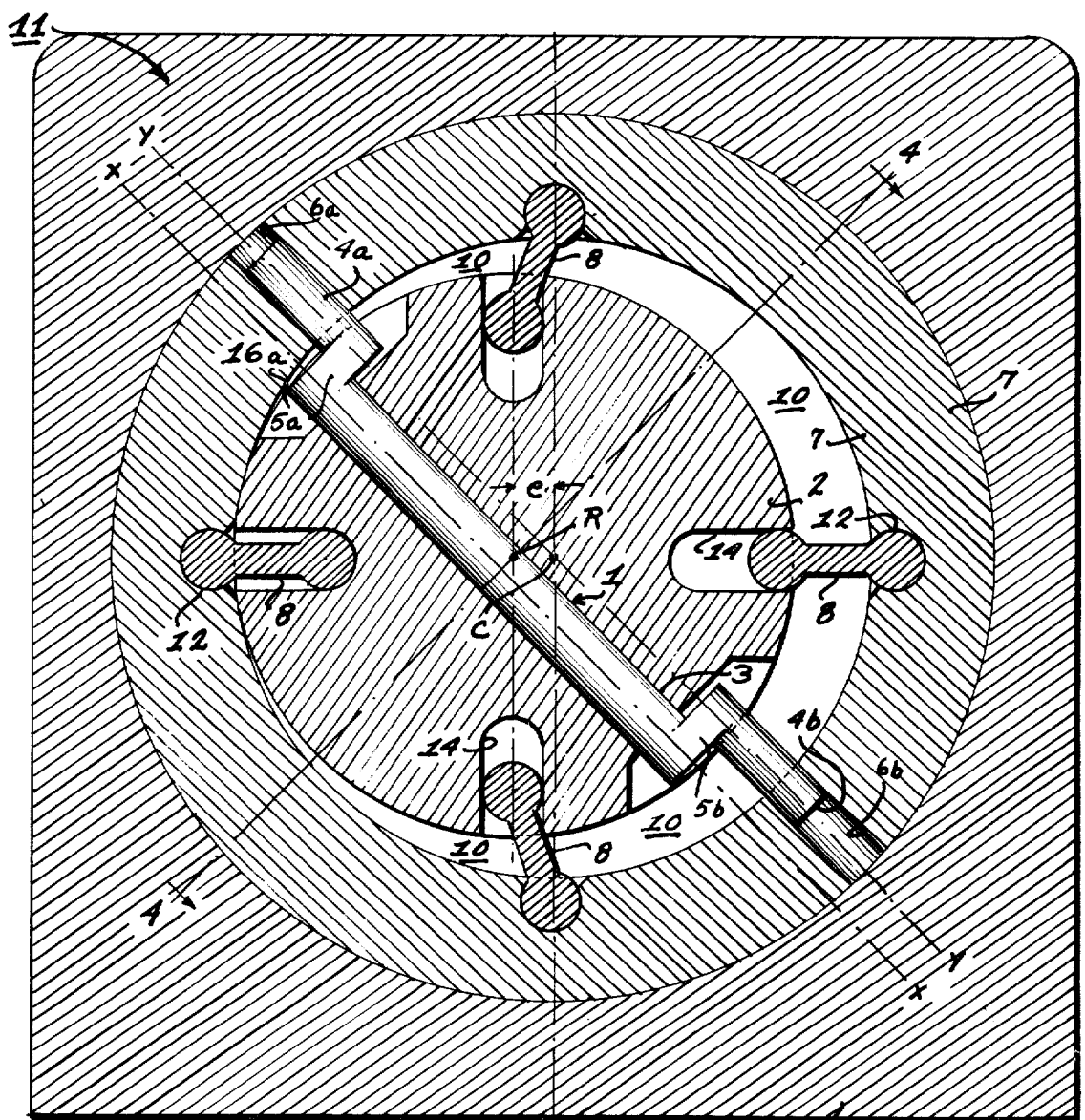

The preferred embodiment of the coupler 1 of the present invention, as best seen in FIG. 1, consists essentially of a double overhung crank having a crank shaft 3 and opposing crank pins 4a and 4b. The crank pins are rigidly connected to the crank shaft 3 by web members 5a and 5b and positioned so that the longitudinal axis "Y" of the crank pins is parallel with the longitudinal axis "X" of the crank shaft. The crank shaft 3 may be disposed in a transverse bore in the rotor 2 as shown in FIG. 4. The crank pins 4a and 4b are disposed within the mutually parallel slots 6a and 6b, diametrically located in the cam ring 7 of the positive fluid displacement pump, the pump body being generally indicated by reference numeral 11. In the illustrated embodiment, the crank pins are slideable longitudinal of their own axes and up and down in the slots.

As is typical with pumps and other fluid displacement devices similar to the one shown in FIG. 1, the rotor 2 is mounted for rotation on an integral shaft about an axis "R" and the cam ring rotates about an axis "C", which is displaced from the rotor axis "R" by a distance "e". In the illustration of FIG. 1, it will be assumed that the rotor 2 is the driving element and the cam ring 7 is the driven element, the latter being rotated by the coupling crank 1. A plurality of vanes 8 form partitions in the interspace between the rotor 2 and the cam ring 7, which vanes, along with the rotor 2, the cam ring 7 and the end plates 9, define a plurality of pumping chambers 10. The vanes 8 are constructed and positioned within the pump similarly to those of the prior art. Each end of each vane is substantially cylindrical in cross section, enabling the vane to have a limited freedom for rotation within its mounting socket 12 in the cam ring 7 and to enable a similar freedom of rotation within a receiving slot 14 in the rotor 2.

Because the fundamental operation of a positive fluid displacement device, such as the one illustrated by FIG. 1, is well known and because the present invention does not involve the operation of the pump itself, a detailed description of the pumping aspects of the fluid displacement device is unnecessary. It is sufficient to say that the simultaneous rotation of the two relatively eccentric bodies, the rotor 2 and the cam ring 7, creates relative movement between them which can be defined as recriprocal movement along the longitudinal axis "Y" of the crank pins 4a and 4b. Thus, during a single revolution of the rotor 2, the four pumping chambers 10 are each constantly changing from minimum to maximum volume to create the pumping action. In the illustrated embodiment, the reciprocal movement along the longitudinal axis "Y" of the crank pins is achieved by allowing the crank pins to move longitudinally within the slots 6a and 6b, however, design considerations may dictate the adviseability of maintaining the crank pins in a constant longitudinal position in the slots 6a and 6b and allowing the reciprocal motion of the rotor to occur as a sliding movement along a more elongated crank shaft. In either case, the crank shaft 3 must be precisely formed in the bore within the rotor 2 to prevent leakage diametrically through the rotor.

The coupling crank 1 of the present invention is adaptable to variable fluid displacement devices which are made variable by including means for changing the eccentricity "e" between the rotor 2 and cam ring 7. One means of changing the eccentricity would be to shift the position of the cam ring mounting block 13 in a direction which would either enlarge or reduce the distance "e" between the centers of rotor and cam ring rotation "R" and "C". The maximum stroke of the device will be determined by the amount of allowable sliding movement of the inner end of the vane 8 within its respective slot 14 of the rotor, which movement must be at least two times the eccentricity "e".

Having described the essential elements of the coupling crank, a reference to FIG. 2 will illustrate how the coupling crank operates to rotate the cam ring 7 at the same angular speed as the rotor 2 while preventing any angular phase shift between the two rotating members. Looking first at a starting position of the rotor 2 and cam ring 7 which shall be identified as Position A of the crank shaft 3, it is seen that the rotor axis "R" and the cam ring axis of rotation "C" can be interconnected by a straight line. At this position of the rotor 2 and cam ring 7, the coupling crank 1 functions as a straight interconnecting rod, it being apparent by reference to the fragmentary side view of the cam ring that the longitudinal axis "X" of the crank shaft 3 and the longitudinal axis "Y" of the crank pins 4a and 4b lie in a common plane with the axes of rotation "R" of the rotor and "C" of the cam ring.

As the rotor 2 is rotated to a position B 45° away from position A, it is apparent that the longitudinal axis "X" of the crank shaft 3 will rotate away from a position coincident with the center of rotation "C" of the cam ring 7 and will no longer lie in a common plane therewith. A straight bar connection between the rotor and the cam ring could obviously not accommodate such a situation where the ends of the bar lying within the cam ring 7 would have to have a separated axis of rotation from that portion of the bar lying within the rotor 2. The double crank coupler 1 of the present invention can, however, accommodate the separation of these two longitudinal axes by reason of the webs 5a and 5b which interconnect the crank pins 4a, 4b, and the crank shaft 3. The ability of the crank shaft 3 to rotate within the rotor bore and the provision of the webs 5a and 5b create the means for allowing the longitudinal axis "Y" of the crank pins 4a and 4b to become separated from the common plane of the longitudinal axis "X" of the crank shaft 3 and the axis of rotation of the rotor R. A separation "d" between the said "X" and "Y" axes is illustrated in FIG. 2 at position B and in the associated fragmentary side view of the cam ring 7.

As a rotor 2 continues to rotate to a position C, 90° from its A position, the distance between the "X" and "Y" axes becomes equal to the distance "e", the separation between the rotor axis "R" and the cam ring axis of rotation "C." Similar to the action of the coupling crank 1, as shown at position B, the coupling crank 1 at position C easily accommodates the displacement "E" between the "X" and "Y" axes by rotating further, as shown in FIG. 3.

As the rotor 2 continues to rotate to a position 180° from position A, the longitudinal axis "X" of the crank shaft 3 and the longitudinal axis "Y" of the crank pins 4a, 4b, will again lie in a common plane with the axes of rotation "R" of the rotor and "C" of the cam ring identical to the coincident axes positions shown in the fragmentary side view applicable to position A. Similarly, the 225° position and the 270° position of the rotor will produce "X" and "Y" axes positions identical with the 45° and 90° positions respectively of the rotor 2, as illustrated in the fragmentary side view applicable to positions B and C of the rotor. As the rotor 2 turns eccentrically with the cam ring 7, the crank coupler 1 goes through two cycles of oscillation, one-half of one cycle being illustrated by the fragmentary side views shown in FIGS. 2 and 3. It should be pointed out that although the relative position of the "X" and "Y" axes are the same for 45° and 315°, for example, the relative position of the rotor and cam ring are not the same. At the 315° position, the rotor will have assumed a position where the crank pin 4b will be fully inserted into the cam ring slot 6b, while the crank pin 4a will have moved outwardly in the opposite cam ring slot 6a.

The crank coupler must be designed so that the longitudinal axis "Y" of the crank pins 4a and 4b does not rotate about the longitudinal axis "X" of the crankshaft 3 far enough to allow the crank pin axis and the crankshaft axis to be deployed in a common plane transverse to the axis of rotation of the cam ring 7 and rotor 2. Such a deployment would create a potential locking condition. The limit created by this design consideration becomes a boundary condition for maximum pump displacement volume because the variation of the eccentricity "e" is limited by the maximum permissable angle of deployment between the crank pins and crank shaft.

If the crank coupler 1 is rigidly constructed, the crank pin axis "Y" will always remain parallel with the crank shaft axis "X" and when these axes remain parallel there can be no angular phase shift between the rotor 2 and the cam ring 7. Any tendency of the cam ring 7 to move angularly in the direction of arrow W (FIG. 2) relative to the rotor 2 will produce counterbalancing forces $F_1$ and $F_2$ on the crank pins 4a and 4b in their respective slots 6a and 6b. These forces operate to load the crank shaft 3 for rotation in opposite directions about its longitudinal axis "X." Since the crank shaft 3 is rigid, these opposing moments cancel out each other, consequently, the cam ring 7 is constrained against rotation relative to the rotor 2.

Although the preferred embodiment, as shown in FIG. 2, provides that the longitudinal axis "X" of the crank shaft 3 passes through the center of rotation "R" of the rotor 2 and the longitudinal axis "Y" of the crank pins 4a and 4b passes through the center of rotation "C" of the cam ring 7, it is not necessary that "X" and "Y" pass through "R" or "C". The preferred form may be desirable from a design and manufacturing standpoint because of the achieved symmetry, however symmetry is not necessary to the functioning of the coupling crank. The "X" axis of the crank coupler need not pass through the center of rotation "R" of the rotor as illustrated in FIG. 1. The "Y" axis of the crank pins need not pass through the center of rotation "C" of the cam ring.

FIG. 5 illustrates a modified crank member 20 with a spherical end portion 21. This end portion 21 is received in a longitudinal, concave slot in the cam ring 7 of approximately the same radius as the sphere. The slot is essentially cylindrical.

The modified crank member 22 in FIG. 6 has end portions 23 and 24 protruding from the central portion 25 about an axis parallel to the longitudinal axis of the central cylindrical portion 25. In this modification, the end portions 23 and 24 are totally within the radial bounds of the central portion 25 so that the entire crank member 22 can be made in one piece and passed through an internal bore in the rotor for easy installation.

The modified crank 22 is shown in FIG. 7 as disposed within an internal bore 27 of a rotor 2a in such a manner as to penetrate a non-integral drive shaft 28 which is used to drive the modified rotor 2a.

The zero phase shift couplers of this invention are adaptable for use in joining any two eccentrically rotating members. Their application has been illustrated with a constrained vane device which is applicable to pumps, motors, heat engines and elements thereof handling gases or liquids or mixtures of the two.

I claim:

1. A coupling for a driving interconnection between a rotating inner member and an eccentrically mounted rotatable outer ring, comprising in combination,
   a crank shaft having two crank pins offset from the crank shaft axis;
   means rotatably receiving the crank shaft in the inner member; and
   slot means disposed radially in the said outer ring to receive the said crank pins.

2. A coupling for a driving interconnection between a rotating inner member and an eccentrically mounted rotatable outer ring, comprising:
   a crank shaft having two crank pins wherein the longitudinal axes of the crank pins are parallel to and spaced apart from the axis of the crank shaft;
   means rotatably receiving the crank shaft in the inner member whereby the crank shaft is disposed within a plane which is perpendicular to the axis of rotation of the inner member; and
   slot means disposed in the said outer ring to receive the said crank pins.

3. The combination of claim 2 wherein the longitudinal axis of the crank shaft passes through the axis of rotation of the inner member.

4. The combination of claim 2 wherein the longitudinal axis of the crankshaft is offset from the axis of rotation of the inner member.

5. The combination of claim 2 wherein the longitudinal axes of the crank pins pass through the axis of rotation of the outer ring.

6. The combination of claim 2 wherein the longitudinal axes of the crank pins are offset from the axis of rotation of the outer member.

7. The combination of claim 2 and further including a drive shaft disposed internally of the inner member and coaxially therewith, said drive shaft having a bore therethrough positioned in alignment with the bore in the inner member which defines the means interconnecting the crank shaft and the inner member.

8. The combination of claim 2 wherein each of the crank pins is circular in cross section and the slot means is defined by an elongated channel having a depth sufficient to clear the end of the crank pin disposed therein.

9. The combination of claim 2 wherein the crank shaft and crank pins are an integral unit having a shaft member of a first diameter and crank pin members which are contained within a cylindrical envelope defined by the crank shaft circumference.

* * * * *